Patented Oct. 6, 1931

1,825,785

UNITED STATES PATENT OFFICE

JOHN FINN, JR., OF SAN FRANCISCO, CALIFORNIA, ASSIGNOR TO BENJAMIN C. MICKLE, OF SAN FRANCISCO, CALIFORNIA

PROCESS OF COATING, VENEERING OR GLAZING CANDLES WITH A PERMANENT COLOR

No Drawing.     Application filed May 19, 1930.   Serial No. 453,862.

My invention relates broadly to the manufacture of candles and more particularly to a process of coating, veneering, or glazing candles with a permanent color.

One of the objects of my invention is to provide a process for coating, veneering, or glazing candles with a permanent color which will not interfere with the burning of the candles.

Another object of my invention is to provide a method of treating wax candles by insoluble and semi-soluble pigments for imparting a permanent color to the candle without giving off harmful poisonous vapors during the process of burning the candle.

Still another object of my invention is to provide a method of applying pigments to wax candles for permanently coloring the candles without interfering with the burning qualities of the candles and without the generation of obnoxious odors during the burning of the candle.

Other and further objects of my invention reside in the method of coating, veneering, or glazing candles with a permanent color as set forth more fully in the following specification.

Heretofore in the art, pigments which have been mixed with wax for the purpose of coloring candles have offered considerable interference to the normal burning of the candle, for such candles gave off poisonous vapors contaminating the atmosphere in which the candles were burned. Anilines and organic dyes which are soluble in wax have proved impractical in coloring candles and are destroyed to a great extent by the stearic acid in the candle.

I have discovered a method of making candles by which the color is fast and will not fade when exposed to light. With candles constructed according to my invention even direct sunlight does not bring about detrimental fading. I utilize insoluble or semi-soluble pigments of either mineral or organic origin. These pigments do not interfere with the burning of the candle and negligible vapor is given off. In my process of "veneering or glazing" candles made from paraffin, composition paraffin and stearic acid, paraffin and synthetic wax, or any other wax composition, I apply to such candles, a thin transparent colored coating by immersing the candle in melted wax which has been colored by the addition of the desired colored pigment. By this method, I obtain a permanent pigment colored candle which has none of the disadvantages heretofore experienced in pigment colored candles. Various coatings may be applied for blending several colors to impart the desired esthetic appearance to the candle. Special precaution is taken to prevent destructive reaction of one pigment coating upon another. For example, in carrying out my invention, a madder lake is made in a pigment which is insoluble in wax. The pigment is then ground to a size which will pass through a 150 mesh screen. The ground pigment is then poured into a wax at a temperature approximately 150° F. The color is then stirred into the wax and the wax is allowed to cool during the stirring process. The wax is then set for at least twelve hours enabling the pigment to saturate the mass. The mass of wax is then heated to 150° F. and strained through a fine cloth. The straining of the pigment is effected in order to eliminate heavy particles which might show in the glaze or veneer on the candle. This color composition of wax and pigment is now heated to 180° F. and stearic acid is added to impart sufficient density and hardness to the finished veneer or glaze. The amount of stearic acid to be used may vary greatly according to the structure of the candle on which the color veneer is to be used. I have found that thirty percent stearic acid added to the mass of color composition of wax and pigment will give very satisfactory results. Other waxes such as carnauba wax or synthetic hardening waxes may take the place of stearic acid in the mixture but in such cases a densifier of some kind is necessary for best results. In fact, the use of paraffin only, mixed with the pigment will accomplish the result desired but this result is not as perfect as that obtained by the use of stearic acid. If the depth of color of this mixture is as desired, it is now ready for veneering or glazing the candle. Should the mixture be too deep in color it can be made lighter by the proper portions of paraffin and stearic acid or whatever wax was used in the mix being added. The color composition of wax and pigment with stearic acid added thereto is raised to a temperature between the limits of 150° F. and 200° F. For best results, I select a temperature of 180° F. The mixture must be thoroughly stirred so that the fine particles of pigment remain in suspension throughout the mass of wax. The mixture must be stirred frequently while being used and the intervals at which this must be done is dependent upon the kind of pigments used, some pigments being heavier than others and having a tendency to settle more quickly. After sufficient heat has been applied to the composition to obtain the required consistency, a candle previously made by any suitable process is next dipped into the color solution. This candle may be 100 percent paraffin or a composition of paraffin and stearic acid, or the material of the candle may be a composition of paraffin and synthetic wax or any wax composition which has the required burning properties. The candle normally has a firm smooth surface on which the color composition in the prepared melt must set. The candle is dipped into the color melt several times or until a sufficient thickness of veneer or depth of color is obtained. The result is that the color composition forms a film over the surface of the candle and permanently colors the same while not interfering with the burning qualities of the candle.

A white candle, for example, may be dipped into a light blue wax composition and allowed to cool; next, a darker shade of blue may be used in the solution; and finally a still darker shade of blue may be employed. This gives the candle a heavier color and the coats of color act as a protection to each other.

A white candle may be dipped in a red wax solution as a base color and thereafter glazed with a yellow wax solution which imparts a beautiful rich russet effect to the candle.

When the candle burns, the color coat is so thick and the particles so fine that this does not interfere with the flame. By reason of the fact that the color pigments are fast to start with, the process of my invention protects such pigments from the light and air so that they remain fixed in color indefinitely. In using different pigments the fineness to which they must be ground varies with the pigment used. To illustrate a condition where different pigments are used consider vermillion, that is, a mercury base where the particles are ground to pass a 250 mesh, which particles are to be glazed with cobalt blue which is ground to a 300 mesh. These finely ground pigments take on a new and added lustre in wax. A pigment color is obtained by stirring the pigment into parafin wax, that is, heated to a temperature of 250° F. The pigment is thoroughly stirred into the wax to permit of maximum bleeding and then allowed to settle while the wax is still under temperature above 150° F. When all of the particles of pigment have gravitated, the wax is then poured off, care being taken not to agitate the settled pigment. The colored wax thus obtained is suitable for use in veneering or glazing candles by remelting the mass and dipping the candles therein as heretofore described. The coloring material will not detrimentally influence the burning of the candle but in fact tends to support combustion by reason of the large wax content thereof at the same time that a permanent color is imparted to the candle.

By my process I can also make solid colored candles in many light shades such as light pink, light blue, light green, etc., in which the pigments used will not affect the burning quality of the candle or give off poisonous vapors. The amount of pigment necessary for the coloring of these candles is so finely ground and is used in such a small quantity that it has no effect on the candle except to give it a permanent color. The colored mass for use in these solid colored candles is made in the same manner as is described herein for veneers. The color is fast to light and not affected by the action of stearic acid.

The principles of my invention in providing a coating which supports combustion and contains composite wax with pigment massed therein may be applied to various constructions of candles regardless of shade, size or shape. The lustre imparted to the candle may be controlled by the particular ratio of the mixture of the wax to the pigments therein by choosing a mixture of various colors of the spectrum for producing desired shades. Ornamentations of desired characteristic may be applied to the coated candles for further improving the esthetic appearance thereof.

I have found the method of my invention highly practical, and while I have described a preferred embodiment of carrying out the invention, I desire that it be understood that modifications may be made within the scope of the appended claims without departing from the spirit of my invention.

What I claim as new and desire to secure by Letters Patent of the United States is as follows:

1. The method of coating candles which consists in grinding a pigment in fine particles, melting a mass of wax and raising the same to a temperature of approximately 150° F., adding the ground pigment to the wax, stirring the ground pigment into the wax until the mass is cool, allowing the wax and pigment mixtures to set, remelting the said mass, straining the mass to remove the oversize particles of pigments therefrom, raising the strained mixture to a temperature of approximately 180° F., adding stearic acid thereto, and dipping candles into the resultant solution for applying a permanently colored coating of film-like material thereto.

2. The method of coating candles which consists in preparing a colored solution including a pigment ground in fine particles and poured into a quantity of wax at approximately 150° F., stirring the mixture until the wax is cool, allowing the wax to set for approximately twelve hours, remelting the mass to a temperature of 150° F., passing the mass in fluid form through a strainer for removing oversize particles of pigment therefrom, raising the mass to approximately 180° F., adding stearic acid thereto, raising the solution to 180° F., and subjecting the solution to a stirring action while dipping a candle therein for imparting a film of colored wax and pigment to the surface of the candle.

In testimony whereof I affix my signature.

JOHN FINN, Jr.